Patented Mar. 22, 1927.

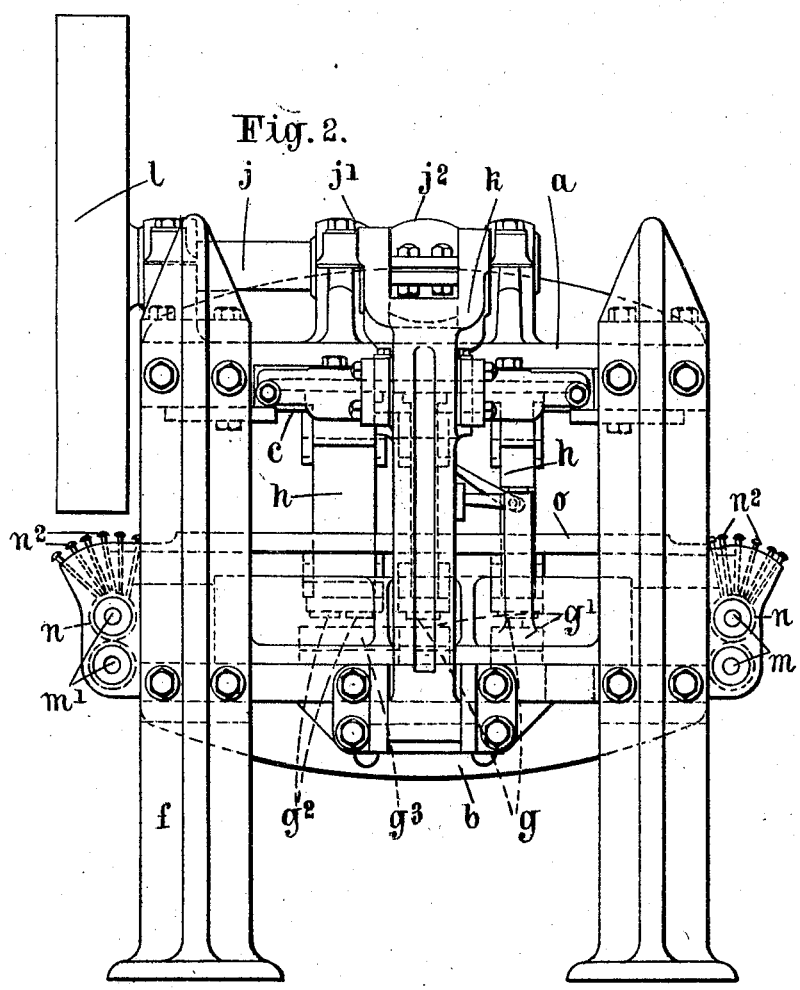

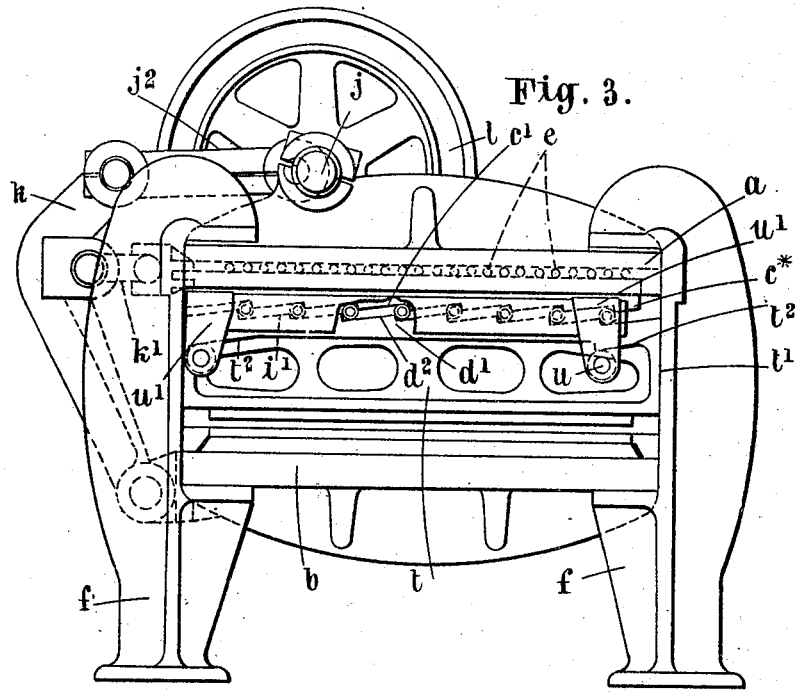
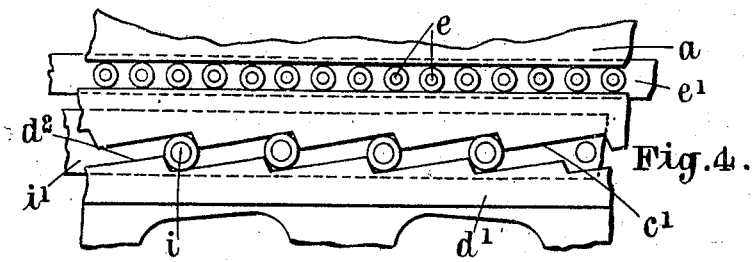
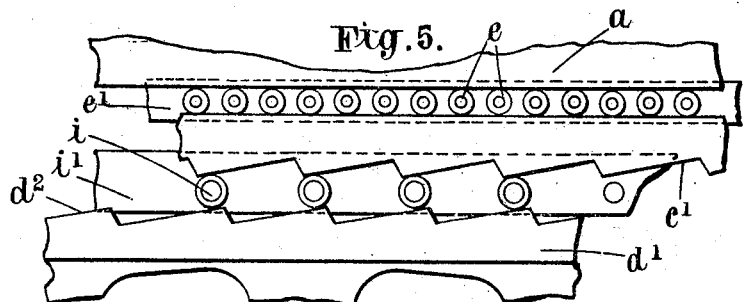

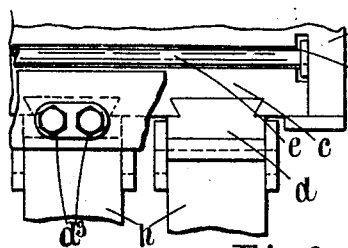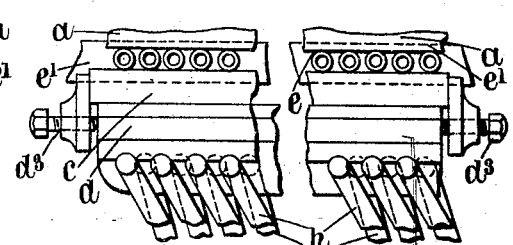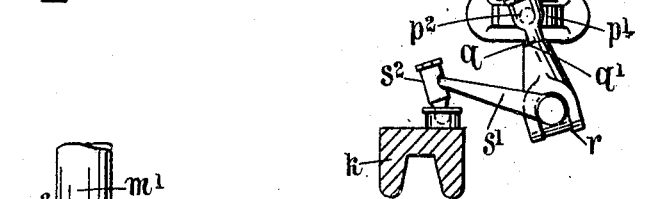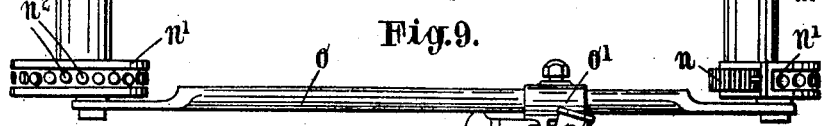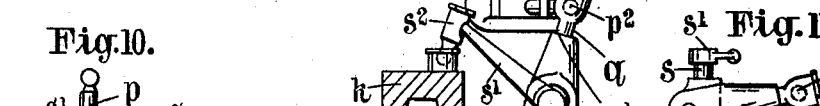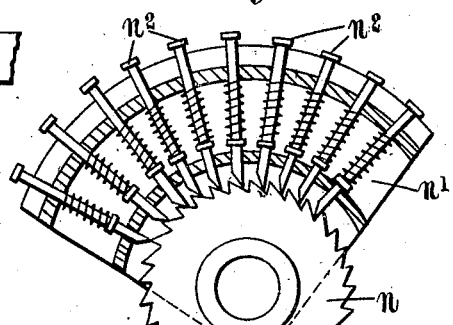

1,622,144

UNITED STATES PATENT OFFICE.

FRANK HUMPHRIS, OF PARKSTONE, ENGLAND, ASSIGNOR OF ONE-HALF TO KENNETH ALEXANDER ROBERTS, OF LONDON, ENGLAND.

MACHINE FOR MANUFACTURING NAILS OR OTHER ARTICLES FROM SHEET OR STRIP METAL OR MATERIAL.

Application filed December 12, 1922, Serial No. 606,498, and in Great Britain December 20, 1921.

This invention relates to a press for stamping out blanks from sheet metal and folding such blanks to form nails, and provides an improved machine for this purpose wherein a ram is actuated by a bearer plate which moves at a right angle to the direction of movement of the ram and which acts upon the ram through edge pressure plates or through wedge action surfaces.

The invention is illustrated in the accompanying drawings, wherein:—

Figure 2 is an end elevation of the machine shown in Figure 1.

Figure 3 is a front elevation of a multipunch and die sheet machine containing another embodiment of the invention.

Figure 4 is an enlarged front elevation of part of the ram operating mechanism of the machine shown in Figure 3.

Figure 5 is a view similar to Figure 4 showing the parts in the position assumed when the ram operating mechanism has reached its complete downstroke position.

Figure 6 is an end elevation of part of the top bolster plate and parts immediately associated therewith of the machine shown in Figures 1 and 2.

Figure 7 is a front elevation of part of the top bolster plate and parts associated therewith shown in Figure 6.

Figure 8 is a plan view of the coupling rod and its controlling levers and joints for actuating the rolls which feed and withdraw a sheet of metal from the machine.

Figure 9 is a view similar to Figure 8 showing the parts in the position assumed at the end of one stroke of the coupling rod.

Figure 10 is a front elevation of the oscillating lever for actuating the coupling rod shown in Figs. 8 and 9.

Figure 11 is a side elevation of the connections between the coupling rod and the beam of the machine.

Figure 12 is a detail view, partly in section, showing the ratchet lever associated with the oscillating lever for actuating the feed rolls.

Like letters of reference refer to like parts throughout the drawings.

Figure 1:
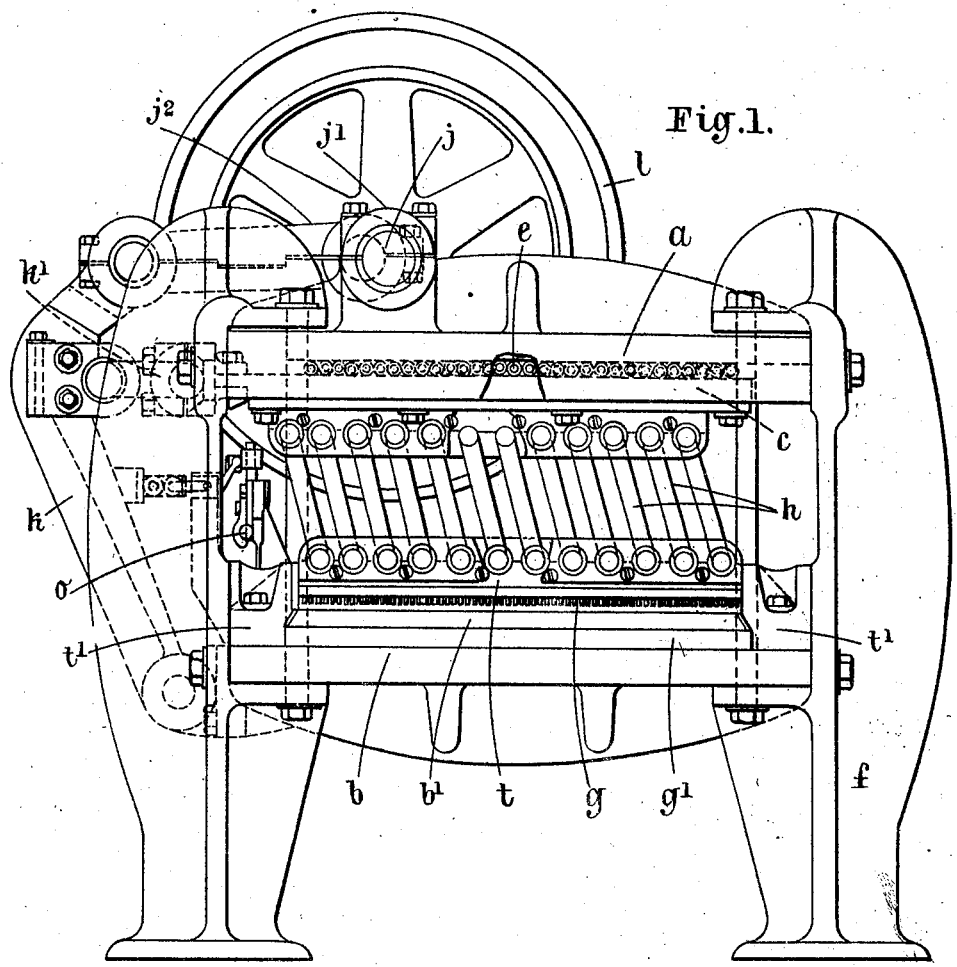
Figure 1 is a front elevation of a multipunch and die sheet nail machine embodying the invention, parts being broken away.

The machine comprises an upper bolster plate $a$ and a lower bolster plate $b$ supported in fixed spaced relation within a suitable frame $f$. A bearer plate slide $c$ is mounted below the under side of the upper bolster plate $a$ and is movable longitudinally of the latter. A number of anti-friction rollers $e$, held in a suitable cage $e'$ (Figs. 6 and 7) are arranged between the upper bolster plate $a$ and the bearer plate slide $c$.

A number of bearer plates $d$ are carried by the under side of the bearer plate slide $c$, as by dovetail connections, as shown in Fig. 6, and the bearer plates $d$ are longitudinally adjustable on the bearer plate slide $c$ as by means of set screws $d^3$ extending through threaded openings in lips which depend from the opposite ends of the bearer plate slide $c$ and engage the ends of the bearer plates $d$, as shown in Figs. 6 and 7.

A ram member $t$ is vertically movable in the frame $f$ between the upper and lower bolster plates $a$ and $b$.

Means are provided for imparting vertical movement to the ram member $t$ from the horizontal movement of the bearer plate slide $c$ and bearer plates $d$. Such means is shown in Figs. 1, 2, 6 and 7 as comprising a plurality of edge pressure ram plates $h$, each of which has one of its ends mounted in a socket in the under side of one of the bearer plates $d$ and has its other end mounted in a similar socket in the upper side of the ram member $t$. When the bearer plate slide $c$ is moved in one direction (to the left in Figs. 1 and 7) the pressure ram plates $h$ will assume inclined positions relative to the bearer plate slide $c$ and ram member $t$, in which position of the parts just mentioned the ram member $t$ will be raised above the lower bolster plate $b$, but when the bearer plate slide $c$ is moved in the opposite direction (to the right in Figs. 1 and 7) the pressure ram plates $h$ will be moved toward a vertical position and thus press the ram member $t$ toward the lower bolster plate $b$. By screwing any one of the set screws $d^3$ at one end of the bearer plate slide $c$ inwardly, and unscrewing the aligned set screw $d^3$ at the opposite end of said bearer plate slide, the bearer plate $d$ engaged by said screws may be longitudinally adjusted to alter the obliquity of the edge pressure ram plates $h$ associated with such bearer plate, and thus the pressure exerted on the ram member $t$ by such bearer plate and its associated edge pressure ram plates may be adjusted.

In Figures 3 to 5 an alternative means for imparting downward pressure upon the ram member $t$ from the longitudinal movement of the bearer plate slide $c^*$ is shown. In said figures the bearer plate slide $c^*$ and the bearer plates $d'$ are shown as provided on their opposed sides with inclines $c'$, and rollers $i$, which are carried in a roller cage $i'$, each works between an incline of one of said members and an incline of the other member, so that, when the bearer plate slide $c^*$ is moved longitudinally in one direction, the rollers $i$, working between the inclines $c'$ of the members $c^*$ and $d'$, will impart downward pressure on the ram member $t$, and, when the bearer plate slide $c^*$ is moved longitudinally in the opposite direction, said rollers will move down said inclines and thus release the pressure on the ram member $t$. Rollers $u$ carried by brackets $u'$ depending from the bearer plate slide $c^*$ bear against inclined faces $t^2$ of the ram member $t$ and thus lift the ram member $t$ when the bearer plate slide $c^*$ is moved in the last-named direction.

Horizontal movement is imparted to the bearer plate slide $c$ shown in Figs. 1, 2, 6 and 7 or to the bearer plate slide $c^*$ shown in Fig. 3 from a shaft $j$, which is journaled in the frame of the machine, through a crank on said shaft, a connecting rod $j^2$ between said crank and the upper end of a beam pivoted at its lower end to the frame of the machine, and flexible connecting means between said beam and the bearer plate slide $c$ or $c^*$.

The ram member $t$ is formed with slides which move in guides $t'$ attached to the frame of the machine, and these slides in the downward movement of the ram member $t$ compel the bending and forming punches $g$ and $g^2$ to correctly engage in their complemental dies $g'$ and $g^3$, which dies are carried by a supplemental bolster plate $b'$ supported by the lower bolster plate $b$ of the machine.

Feed rolls $m$ and $m'$ are mounted, respectively, at opposite sides of the machine for feeding sheets of material between the punch $g$ and its complemental die $g^1$ and between the punch $g^2$ and its complemental die $g^3$, as shown in Fig. 2. These feed rolls $m$ and $m'$ are each mounted on a shaft which carries a ratchet wheel $n$. Levers $n'$ are mounted to rock on the shafts of the feed rolls $m$ and $m'$ and each carries a plurality of spring actuated pawls $n^2$ which, when said levers $n'$ are rocked in one direction, engage the ratchet wheels $n$ and impart a partial rotation to the latter. The pawls $n^2$ are mounted in fan-like form on the levers $n^1$, as shown in Figure 12, in order to afford a number of engagements with the ratchet wheels $n$ of the feed rolls $m$ and $m'$ for each pitch distance the levers $n'$ are rocked on the shafts of the feed rolls $m$ and $m'$ and thus make it possible to correctly commence and finish the feed of the plates in substantially the same way that such feed would be effected if ratchet wheels of extremely small pitch were employed.

Oscillating movement is imparted to the levers $n'$ from the movement of the beam $k$ through a coupling rod $o$. A coupling joint $o'$ is adjustably mounted on the coupling rod $o$ and is capable of rotary movement at a right angle to the axis of said rod. An oscillating lever $p$ extends through an opening in the coupling point $o'$ and has one of its ends slidably mounted in a rotatable bearing $p'$ carried by the frame $f$ of the machine. The other end of the lever $p$ is connected by a universal coupling point $p^2$ with the end of a lever $q$. The lever $q$ is connected by a telescopic joint $q'$ to a forked joint $r$ having a splined socket in which a splined shaft $s$ is longitudinally movable. The shaft $s$ is axially rotatable in a socket on the frame $f$ and at its free end carries an arm $s'$, which arm has a ball-and-socket connection $s^2$ with the beam $k$ of the machine.

When the beam $k$ is rocked in the manner described above, the lever $s'$ through the parts just described will impart an oscillating movement to the levers $n'$ to cause a partial rotation of the feed rolls $m$ and $m'$.

What I claim is:

1. A nail making machine, comprising a stationary die, a punch, a punch carrying ram movable towards and away from the die, a bearer plate slide movable at right angles to the direction of movement of the ram, means for moving the ram by movement of the bearer plate slide, a fixed bolster plate, and rollers interposed between the bearer plate slide and the bolster plate.

2. A nail making machine, comprising a stationary die, a punch, a punch carrying ram movable towards and away from the die, a bearer plate slide movable at right angles to the direction of movement of the ram, a bearer plate carried by the bearer plate slide, means interposed between the ram and bearer plate for effecting movement of the ram by movement of the bearer plate slide, a fixed bolster plate, and rollers interposed between the bearer plate slide and the bolster plate.

3. A nail making machine, comprising a stationary die, a punch, a punch carrying ram movable towards and away from the die along a straight path, a bearer plate slide movable along a straight path at right angles to the path of the ram, means for moving the ram by movement of the bearer plate slide, a fixed bolster plate, and rollers interposed between the bearer plate slide and the bolster plate.

4. A nail making machine, comprising a stationary die, a punch, a punch carrying ram movable towards and away from the die, a bearer plate slide movable at right angles to the direction of movement of the ram, a bearer plate adjustably carried by the bearer plate slide, and means interposed between the ram and bearer plate for effecting movement of the ram by movement of the bearer plate slide.

5. A nail making machine, comprising a stationary die, a punch, a punch carrying ram movable towards and away from the die, a bearer plate slide movable at right angles to the direction of movement of the ram, a bearer plate carried by the bearer plate slide, means for adjusting the position of the bearer plate in the bearer plate slide in the direction in which the bearer plate slide is movable, and means interposed between the ram and bearer plate for effecting movement of the ram by movement of the bearer plate slide.

6. A nail making machine, comprising a stationary die, a punch, a punch carrying ram movable towards and away from the die, a bearer plate slide movable at right angles to the direction of movement of the ram, means for effecting movement of the ram in one direction by movement of the bearer plate slide in a corresponding direction, said ram having inclined faces, and rollers carried by the bearer plate slide to engage the inclined faces to effect a return movement of the ram when the direction of movement of the bearer plate slide is reversed.

London, England, 1st December, 1922.

FRANK HUMPHRIS.